UNITED STATES PATENT OFFICE.

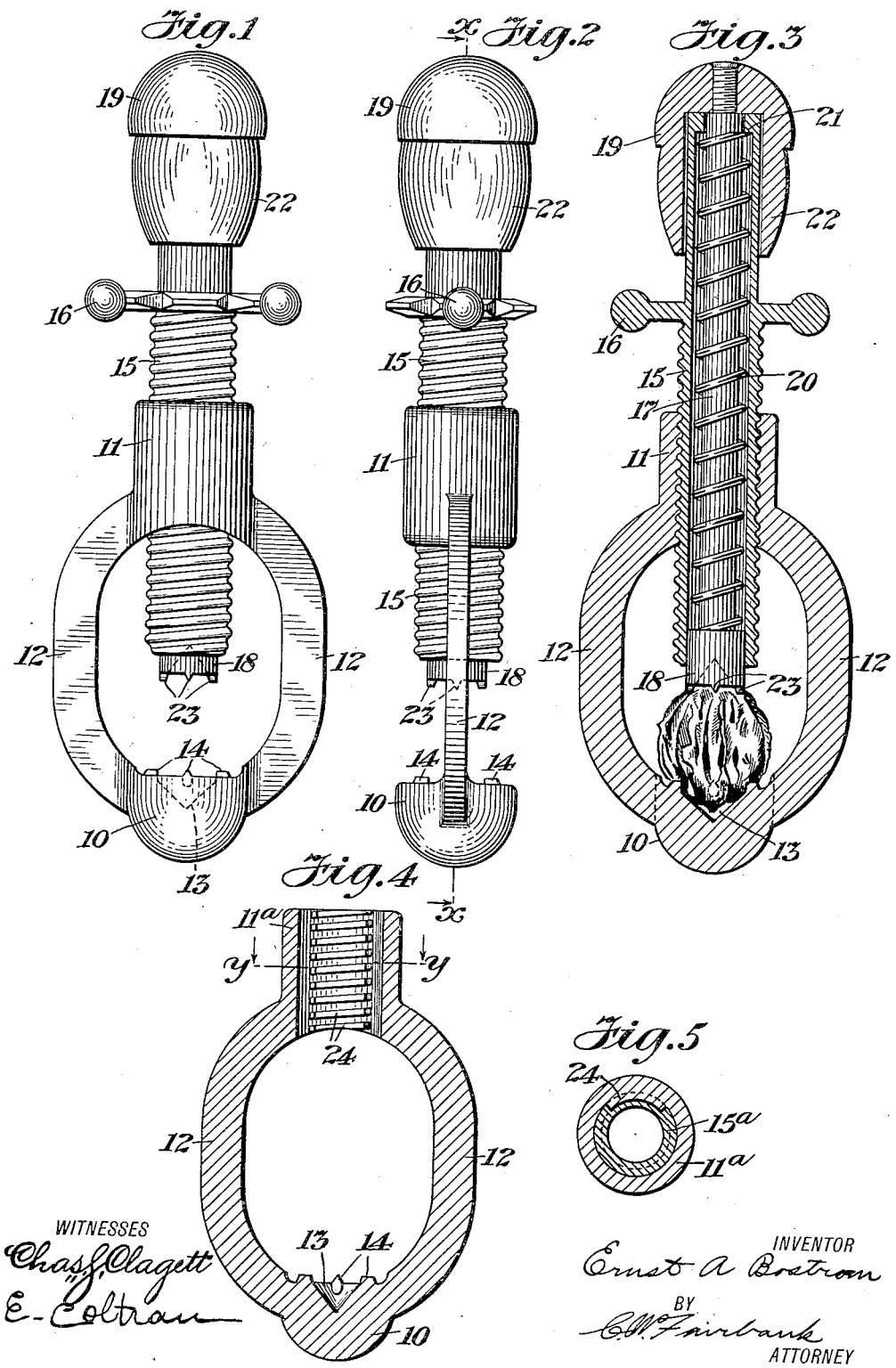

ERNST A. BOSTROM, OF ATLANTA, GEORGIA.

NUTCRACKER.

1,094,698.  Specification of Letters Patent.  Patented Apr. 28, 1914.

Application filed October 29, 1913. Serial No. 797,999.

*To all whom it may concern:*

Be it known that I, ERNST A. BOSTROM, a citizen of the United States, and a resident of Atlanta, in the county of Fulton and State of Georgia, have invented certain new and useful Improvements in Nutcrackers, of which the following is a specification.

This invention relates to certain improvements in nut crackers, of that type in which a nut is held in proper position on a suitable support and receives a sharp, quick blow to crack, split or break the same.

In my improved construction I utilize a spring for imparting the required force to the blow, the parts being so constructed that the breaking, cracking or splitting member is first moved away from the nut to effect a distortion of the spring, and is then released to impart the blow.

My improved construction embodies various important features by means of which the force of the blow may be controlled by varying the distortion of the spring, and the normal distance between the nut support and the blow delivering member may be regulated.

Various changes may be made in the details of construction and within the scope of the appended claims without departing from the spirit of my invention and therefore the accompanying drawings are to be considered in an illustrative rather than in a limiting sense.

One main embodiment of my invention is illustrated in these drawings to which reference is to be made, and in which similar reference characters indicate corresponding parts throughout the several views.

Figure 1 is a side elevation of a device constructed in accordance with my invention; Fig. 2 is an edge view of said device; Fig. 3 is a longitudinal section on the line *x—x* of Fig. 2; and Figs. 4 and 5 are sectional details showing a slightly modified form of construction, Fig. 5 being a section on the line *y—y* of Fig. 4.

In the specific form illustrated, I provide a main body member preferably in the form of a casting and including a base 10 adapted to serve as a support for the nut to be cracked, a boss or collar 11 through which the hammer or blow-delivering member operates, and connecting portions 12 preferably in the form of oppositely disposed arms. The base 10 is preferably of somewhat greater width than the thickness of the arms 12 and presents a surface opposed to but spaced from the inner end of the boss or collar 11. This surface may be roughened, recessed or formed in any suitable manner so as to prevent the nut from slipping laterally when struck. As shown the base 10 has a central conical recess 13 around the edges of which are sharp projections 14 which act with the recess to center and retain the nut. Through the boss or collar 11 extends a sleeve 15 which may be adjusted endwise toward or from the nut support, preferably by screw thread connections. The sleeve may be provided with flanges, knobs or other projections 16 above the end of the collar 11 and by means of which the sleeve may be easily turned by hand. The pitch and size of the threads are such that the sleeve may be adjusted through a considerable range by a very few turns. Extending lengthwise through the sleeve is a plunger 17 terminating at the lower end in a head 18 adapted to engage with the nut to break, crack or split the latter, and terminating at the upper end in a knob, head or handle 19. The body portion of the plunger is somewhat smaller than the internal diameter of the sleeve so that there is sufficient space left for a coil spring 20, one end of which normally abuts against the head 18 or any other suitable stop at the lower end of the plunger and the opposite end of which normally abuts against an inwardly directed flange 21, or other suitable stop adjacent the upper end of the sleeve 15. The knob or head 19 may be of any suitable character but it is desirable to have it of such shape and size that it may be readily grasped in the hand to pull up the plunger as hereinafter more fully set forth. As shown the head is provided with a skirt or annular flange portion 22 encircling and telescoping with the upper end of the sleeve above the part 16. The length of the plunger is such that the head 18 normally projects slightly beyond the lower end of the sleeve and its further downward movement is limited by the engagement of the handle of head 19 with the upper end of the sleeve.

I have shown the blow-delivering head 18 as being provided with an annular series of projections or points 23, encircling a conical recess in the head, and corresponding to the projections 14 of the base. It is of course evident that the contacting face of this blow-delivering member or hammer may be of any desired character and in some instances may be especially designed for a particular kind of nut to be cracked. I may provide this head with a single sharp centrally disposed projection adapted to split the shell of the nut rather than crush or break it.

In the specific form illustrated in Figs. 1, 2 and 3 the sleeve 15 is held within the boss or collar 11 by ordinary screw threads and one complete rotation is necessary for an endwise advancement of the sleeve through a distance equal to the pitch of the thread. Any other suitable mechanism may be employed for normally preventing the endwise movement of the sleeve during the operation of cracking or breaking a nut but permitting of such endwise movement in the adjusting of the device. In Figs. 4 and 5 I have shown the bore of the boss 11ª provided with a series of short screw threads 24, each thread extending only part way around the inner surface of the bore. The sleeve 15ª adapted to coöperate with this form of thread may have the threads thereon cut away along one side to form a groove of a width equal to the length of the threads 24. Thus if the sleeve be rotated to bring the threads 24 opposite the said groove, the sleeve may move endwise freely without rotation. When the sleeve has been moved endwise to the desired position a partial rotation of the sleeve will bring the threads into registry and prevent further endwise movement of the sleeve. Various other means may be provided to accomplish the same result for instance the sleeve may be provided with a series of projections movable through a groove in the boss or collar 11 and adapted to enter recesses at the edge of the grooves upon the partial rotation of the sleeve.

In using my improved device the nut to be cracked is placed on the base portion 10 and is properly centered and positioned by the recess 13 and the projections 14. The sleeve 15 is rotated to bring the lower end either directly into engagement with the nut so as to positively lock the latter in place or if desired the end of the sleeve may be left at a very short distance from the nut. By pulling upwardly on the handle 19 the spring 20 will be put under compression and the head 18 will be drawn away from the nut. Upon releasing the handle 19 the spring will force the head 18 directly toward and into engagement with the nut to break, crack or split the latter. It will be noted that the force of the blow is dependent upon the strength of the spring and the distance to which the head 18 is moved away from the nut before it is released. The sides of the nut may be readily held between the thumb and finger without any danger of injury as the blow-delivering head or hammer is properly guided and can not strike except at one point. Furthermore, the head 18 can only move out of the end of the sleeve a limited distance so that the nut can not be completely crushed by the head and the said head cannot come in contact with the base or approach it so near as to make possible the pounding of the thumb or finger by the head. If all of the nuts to be cracked are of approximately the same size, it is not necessary to adjust the sleeve for each nut and the operation of cracking the nuts may be carried on with great rapidity. Even though the nuts vary greatly in size the sleeve may be very easily and quickly adjusted to bring the blow delivering head into proper position for each nut.

Having thus described my invention, what I claim is:

1. A nut cracker having in combination a nut support, a member normally stationary in respect thereto but adjustable toward and from the same, and a blow delivering member guided by said first-mentioned member.

2. A nut cracker having in combination a nut support, a member normally stationary in respect thereto but adjustable toward and from the same, and a blow delivering member guided by said first-mentioned member and supported thereby.

3. A nut cracker having in combination a nut support, a member normally stationary in respect thereto but adjustable toward and from the same, a blow delivering member guided by said first-mentioned member, and a spring having engagement with both of said members and normally tending to move said blow delivering member toward said support.

4. In combination, a nut support, a sleeve normally stationary but movable longitudinally toward and from said support and a plunger member movable longitudinally through said sleeve and provided with a head constituting a blow-delivering member.

5. In combination, a nut support, a sleeve normally held rigid in respect thereto but adjustable longitudinally toward and from the same, a blow-delivering member movable lengthwise through said sleeve and a spring within said sleeve normally tending to move said blow-delivering member toward said support.

6. In combination, a nut support, a collar spaced therefrom and rigid in respect thereto, a sleeve longitudinally adjustable through said collar, and toward and from said support, a member movable lengthwise through said sleeve and adapted to impart a blow to a nut on said support and a spring within said sleeve normally tending to force said member toward said support.

7. In combination, a body member including a nut support, a collar spaced therefrom and arms holding said collar rigid in respect to said support, an externally threaded sleeve adjustable lengthwise through said collar, a plunger extending through said sleeve and having a blow-delivering head at one end normally spaced from said support and having a handle at the opposite end whereby the blow-delivering head may be moved away from said support and a coiled spring within said sleeve and encircling said plunger and normally tending to move said head toward said support.

Signed at Atlanta in the county of Fulton and State of Georgia this 22 day of October A. D. 1913.

ERNST A. BOSTROM.

Witnesses:
L. V. VOUGHT,
W. T. JORDAN.

Copies of this patent may be obtained for five cents each, by addressing the "Commissioner of Patents, Washington, D. C."